No. 789,387.

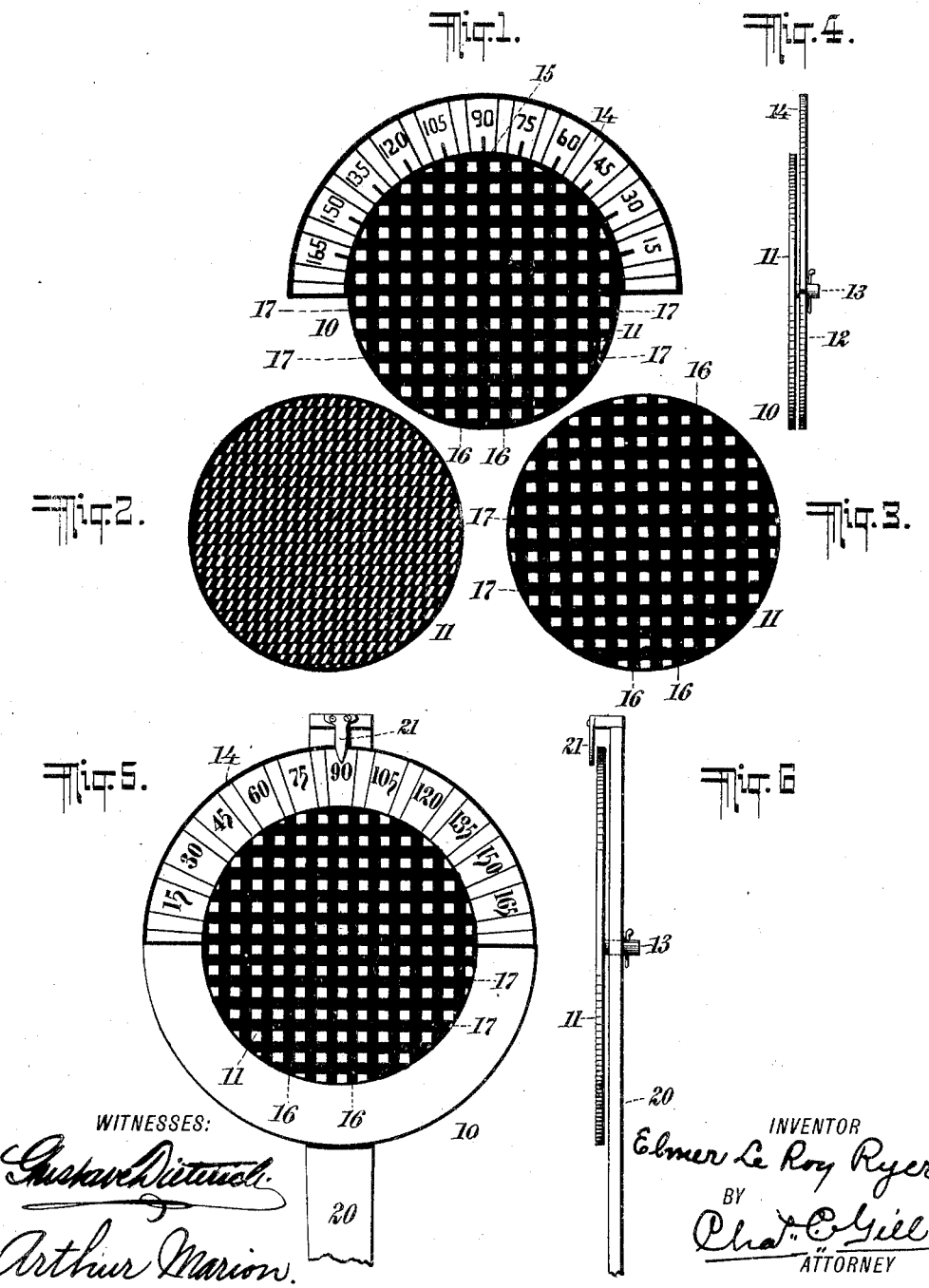

Patented May 9, 1905.

UNITED STATES PATENT OFFICE.

ELMER LE ROY RYER, OF NEW YORK, N. Y.

ASTIGMATIC CHART.

SPECIFICATION forming part of Letters Patent No. 789,387, dated May 9, 1905.

Application filed July 23, 1904. Serial No. 217,752.

*To all whom it may concern:*

Be it known that I, ELMER LE ROY RYER, a citizen of the United States, and a resident of New York, in the county of New York and State of New York, have invented certain new and useful Improvements in Astigmatic Charts, of which the following is a specification.

The invention relates to improvements in astigmatic charts or charts for use in determining, estimating, and correcting astigmatism in the human eye.

In regular astigmatism the meridian of least error is always at right angles to the meridian of greatest error.

In discovering and estimating astigmatic conditions two points are paramount—to wit, first, the location of the meridian of least error, which denotes at what position the axis of the cylindrical lens must be placed, and, second, the amount of error in the meridian of greatest error. The meridians of least and greatest errors may lie along any meridians at right angles to each other. Thus each of the one hundred and eighty meridians (counting one degree as a meridian distance) should be tested; and the object of my invention is to provide an inexpensive and convenient chart by which this testing on all the meridians may be performed.

The chart of my invention comprises a semicircular scale with the degrees from one to one hundred and eighty denoted thereon, and a rotary dial set within said scale and having a pointer adapted to coöperate with said scale, the face of said dial being provided with two sets of parallel lines crossing each other at right angles and equally spaced and being equal in width to one another and to the spaces between them, thereby producing a field of black and white squares or checks or one having a checkered effect. I prefer that the lines be from one-eighth to three-eighths of an inch in width, with the spaces between the lines of corresponding width.

In the employment of the chart the dial will be rotated slowly, and if no astigmatism is present the field of the dial will during its entire rotation appear unchanged or covered with equidistant black and white checks or squares. If, however, astigmatism should exist, the lines on the field of the dial will appear as squares only when said lines coincide exactly with the meridians of greatest and least error, and when under such condition said lines so appear the axis for the lenses will be accurately denoted on the aforesaid scale; but at such time one set of said lines will appear gray and farther away than the other set of lines. The operator will then in continuing the investigation to find the amount of error in the meridian of greatest error add before the eye cylindrical lens after cylindrical lens with their axes at the prescribed point until all the lines are made to appear equally black to the patient. To corroborate the correction or ascertainment thus found, the dial will be given a slow rotation and the lines thereon must during such rotation appear perfectly straight. When during the rotation of the dial the lines thereon are not in position to coincide with the meridians of greatest and least error, said lines and the squares formed by them will be irregular throughout, and as said dial in each rotation carries its lines over the line of each meridian every meridian is tested.

The invention will be fully understood from the detailed description hereinafter presented, reference being had to the accompanying drawings, in which—

Figure 1 is a face view of a chart constructed in accordance with and embodying the invention. Fig. 2 is a like view of the dial as the same appears to a patient having astigmatism when the lines on said dial do not coincide with the meridians of greatest and least error in his eye. Fig. 3 is a like view of the dial as the same appears to the patient after it has been sufficiently rotated to bring its lines into coincidence with the meridians of greatest and least error in his eye, except that at such time and before the proper lenses have been placed before the eye one set of said lines (the horizontal lines in Fig. 3) will appear as gray and farther away than the other or black set of lines. Fig. 4 is an edge view of the chart. Fig. 5 is a face view of a modified arrangement of the chart in which both the dial and scale are on one integral piece of material and rotate together, the numbers on the scale being reversed or reading from left to right and a stationary pointer being provided for the scale; and Fig. 6 is an edge view of same.

In the drawings, 10 designates the chart as a whole; 11, the rotary dial; 12, the stationary back or support for said dial; 13, the pivot by which said dial is secured to said support; 14, the scale which will ordinarily be printed on said support above said dial, and 15 a pointer carried by said dial and adapted when the dial is rotated to move along said scale. The scale 14 bears the radial lines of a half-circle designated from "1°" to "180°." The field of the dial 11 bears the sets of parallel lines 16 17, crossing each other at right angles and preferably being of equal width and separated from one another by spaces equal to the width of said lines, whereby said field becomes covered with equidistant and corresponding black and white squares.

The chart of my invention thus comprises a rotary member 11, having two sets of right-angular lines 16 17, a support for said member, and the scale 14 for coöperation therewith.

In the use of the chart the eye will in the customary way be directed to the chart and the dial 11 slowly rotated. If no astigmatism exists, the dial will remain to the eye tested at all times of the normal natural appearance shown in Fig. 1; but if astigmatism should be present the dial will to the eye tested have the irregular appearance shown in Fig. 2 at all times during its rotation until the lines thereon coincide with the meridians of greatest and least errors, at which time the dial will to the eye tested have its lines straight and blocks or squares true, as shown in Fig. 3, and the correct axis for the cylindical lenses thereafter to be used will be denoted on the scale 14. At this time, however, one set of the lines (the horizontal ones in Fig. 3) will appear to be gray and farther away than the other or black-appearing set. Then, with the axis thus ascertained, cylindrical lenses will with their axes at the prescribed point be added before the eye until the lines on the dial become to appear equally black and remain equally black and straight throughout a rotation of the dial, thus completing the test and accurately denoting the proper correction.

The chart of my invention is particularly advantageous in that it brings within the scope of the test or investigation all the meridians and accurately and positively indicates the axis on which the cylindrical lenses must be placed before the eye, and said chart is also of great advantage in that before said axis has been ascertained all the lines and squares or blocks on the dial appear to be irregular, and the patient is not at that time called upon to determine simply the degree of blackness of certain lines. In the use of my chart the patient has no concern with the blackness of any of the lines until after the lines have straightened out and the proper axis for the lenses has been definitely and accurately ascertained.

The chart shown in Figs. 1 to 4, inclusive, comprises a stationary scale 14 and rotary dial 11, the numbers on said scale reading from right to left. A mere reversal of the construction shown in Figs. 1 to 4, inclusive, is presented in Figs. 5 and 6, in which I show the rotary dial 11 and scale 14 as being in one integral piece and pivotally mounted on a stationary support 20, having a pointer 21 extended down over the edge of said scale, the figures on which read from left to right, as is necessary by reason of the fact that the scale and dial both rotate together.

I illustrate in the drawings the preferred character of lines and checks or spaces on the field of the dial; but my invention is not confined to the special outlines of lines and spaces shown, since these may vary to some extent, as will be obvious, without departing from my invention.

What I claim as my invention, and desire to secure by Letters Patent, is—

1. The chart comprising the scale and rotary dial, the latter having on its face the field composed of sets of parallel lines crossing each other at right angles; substantially as set forth.

2. The chart comprising the scale and rotary dial, the latter having on its face the field composed of sets of parallel lines crossing each other at right angles, said lines being equal in width; substantially as set forth.

3. The chart comprising the scale and rotary dial, the latter having on its face the field composed of sets of parallel lines and spaces crossing each other at right angles, said spaces being equal in width; substantially as set forth.

4. The chart comprising the scale and rotary dial, the latter having on its face the field composed of sets of parallel lines and spaces crossing each other at right angles, said lines and spaces being equal in width; substantially as set forth.

5. The chart comprising the stationary scale, and the rotary dial having a pointer for said scale, said dial having on its face the field composed of sets of parallel lines and spaces crossing each other at right angles; substantially as set forth.

6. The chart comprising the pivotally mounted dial, a support therefor, a scale extending around a part of said dial, and a pointer for said scale, said dial having on its face a field composed of sets of lines and spaces crossing each other at right angles; substantially as set forth.

Signed in Manhattan borough, New York city, in the county of New York and State of New York, this 21st day of July, A. D. 1904.

ELMER LE ROY RYER.

Witnesses:
CHAS. C. GILL,
ARTHUR MARION.